UNITED STATES PATENT OFFICE.

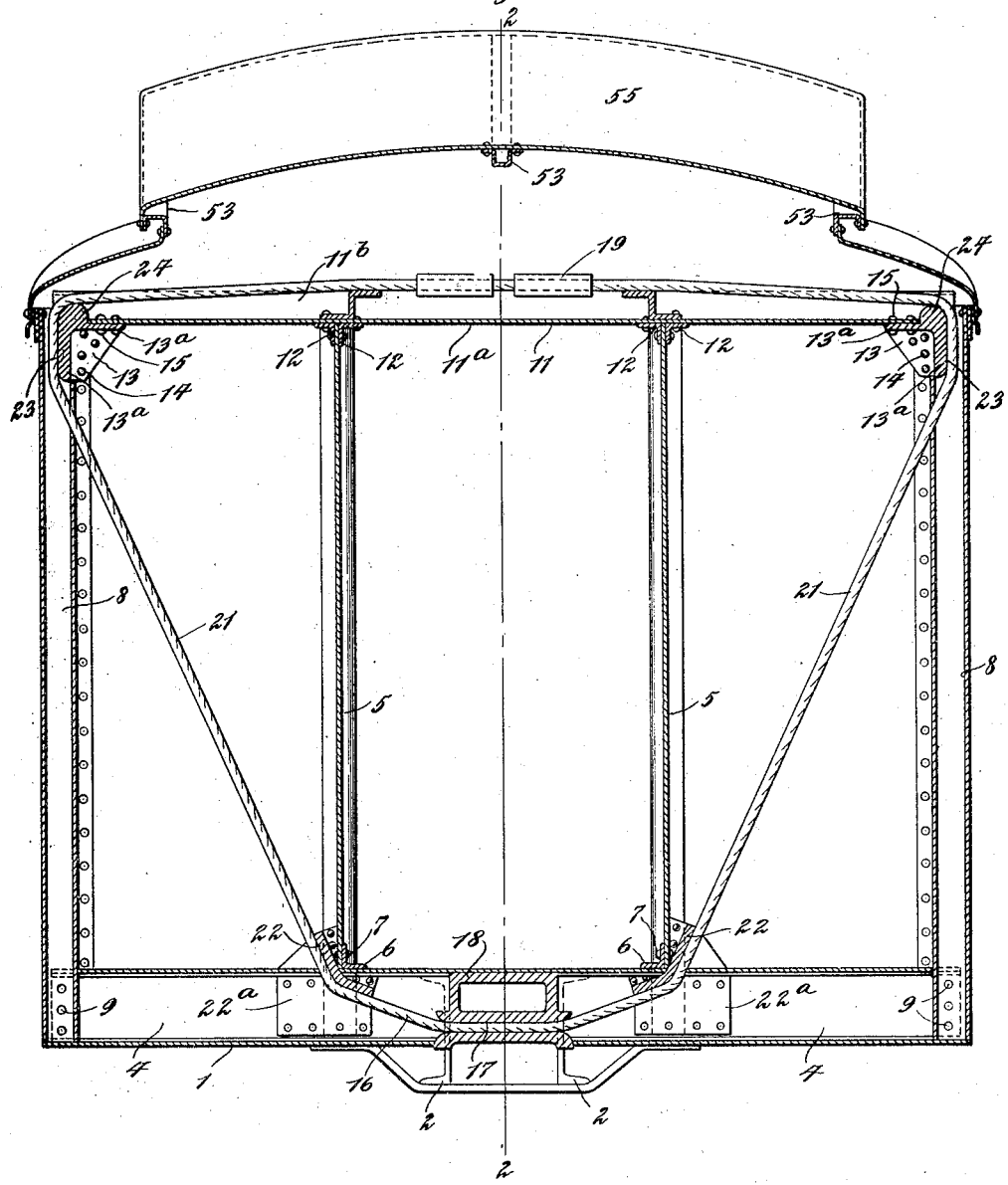

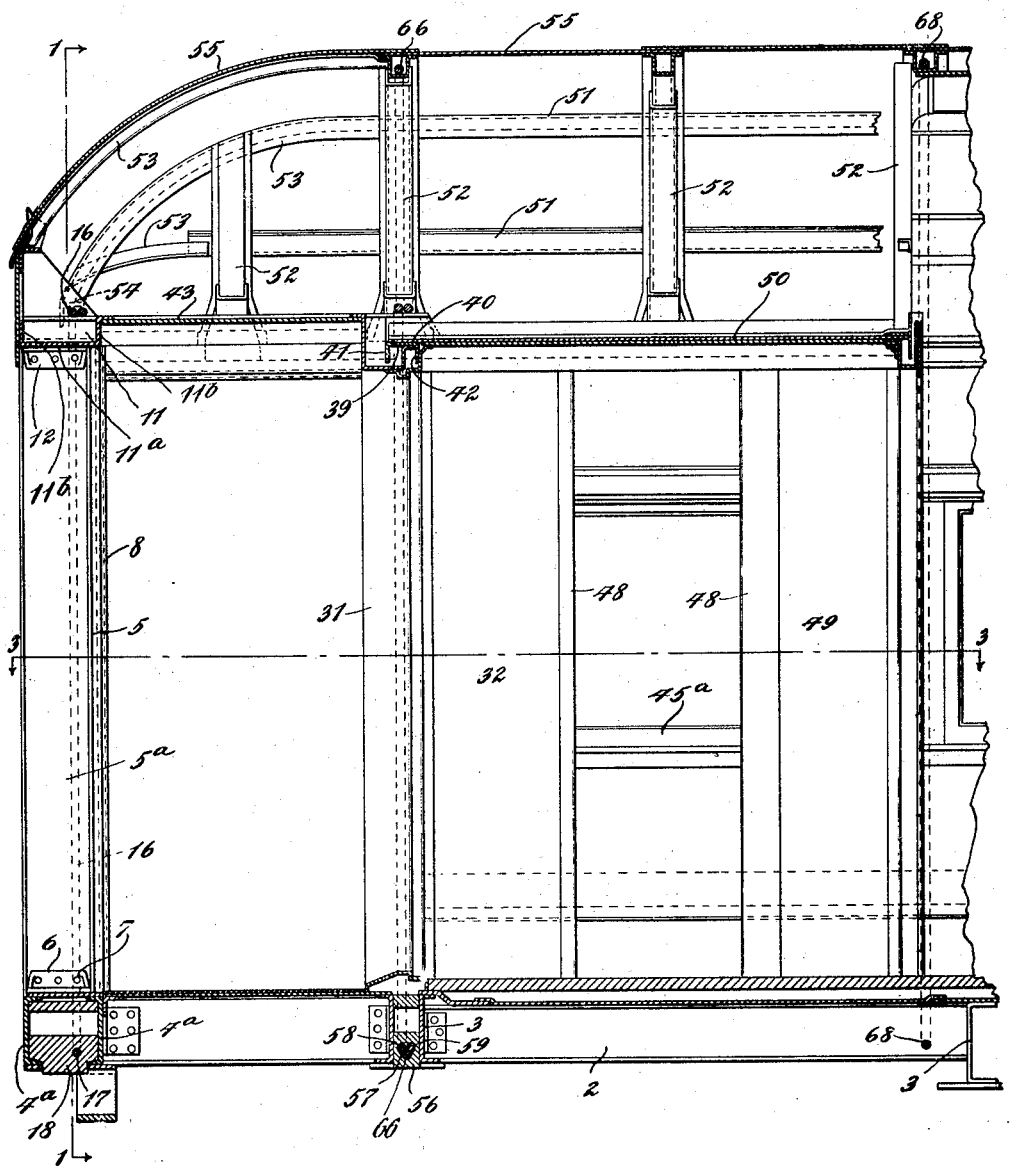

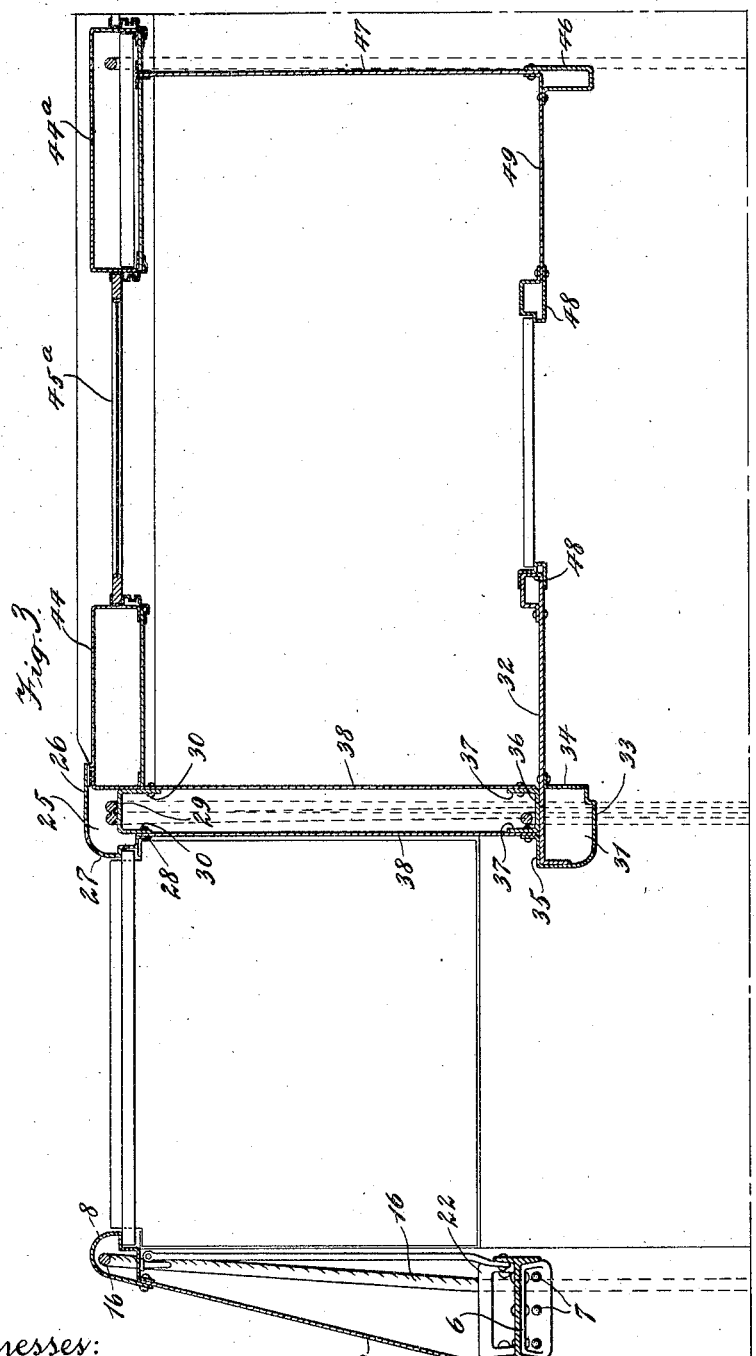

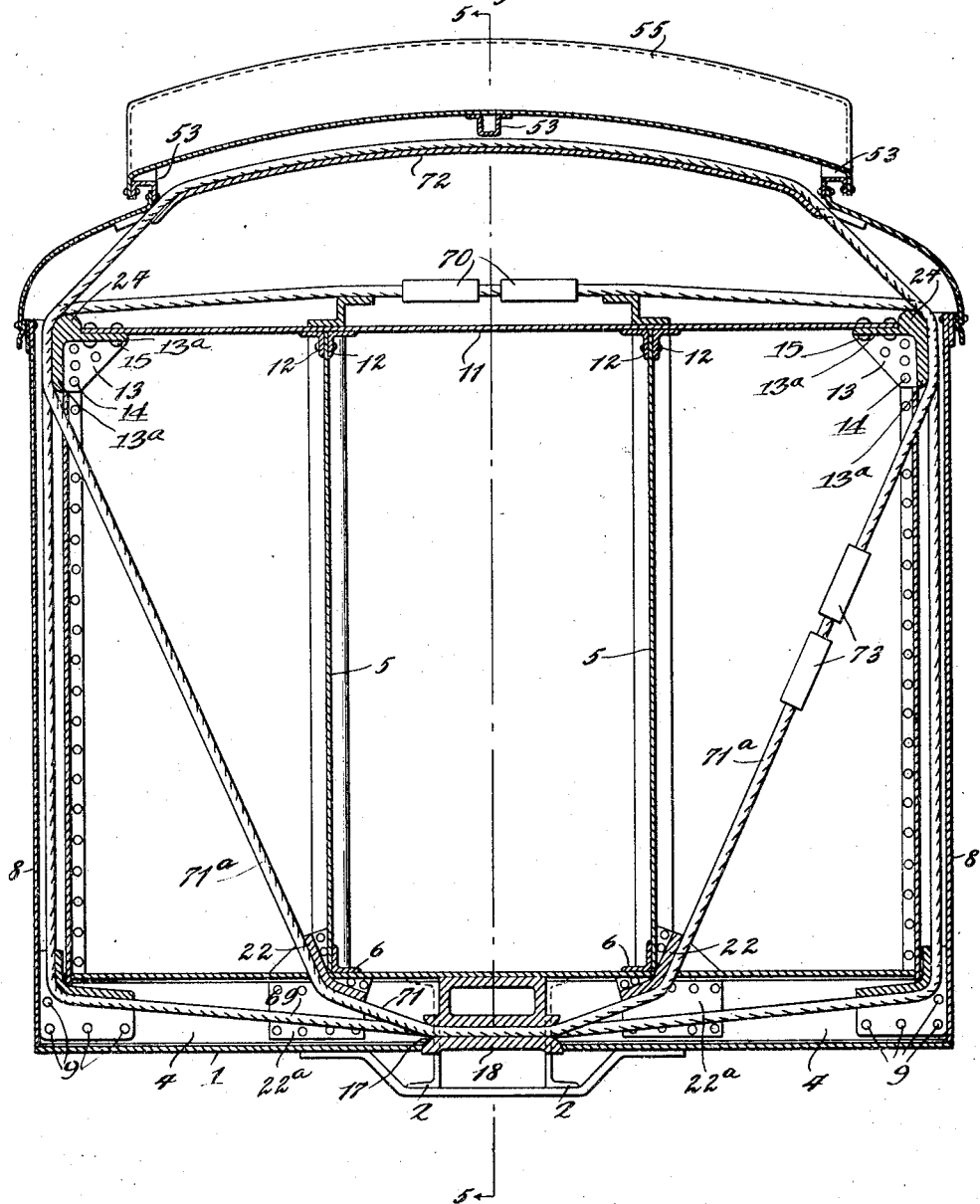

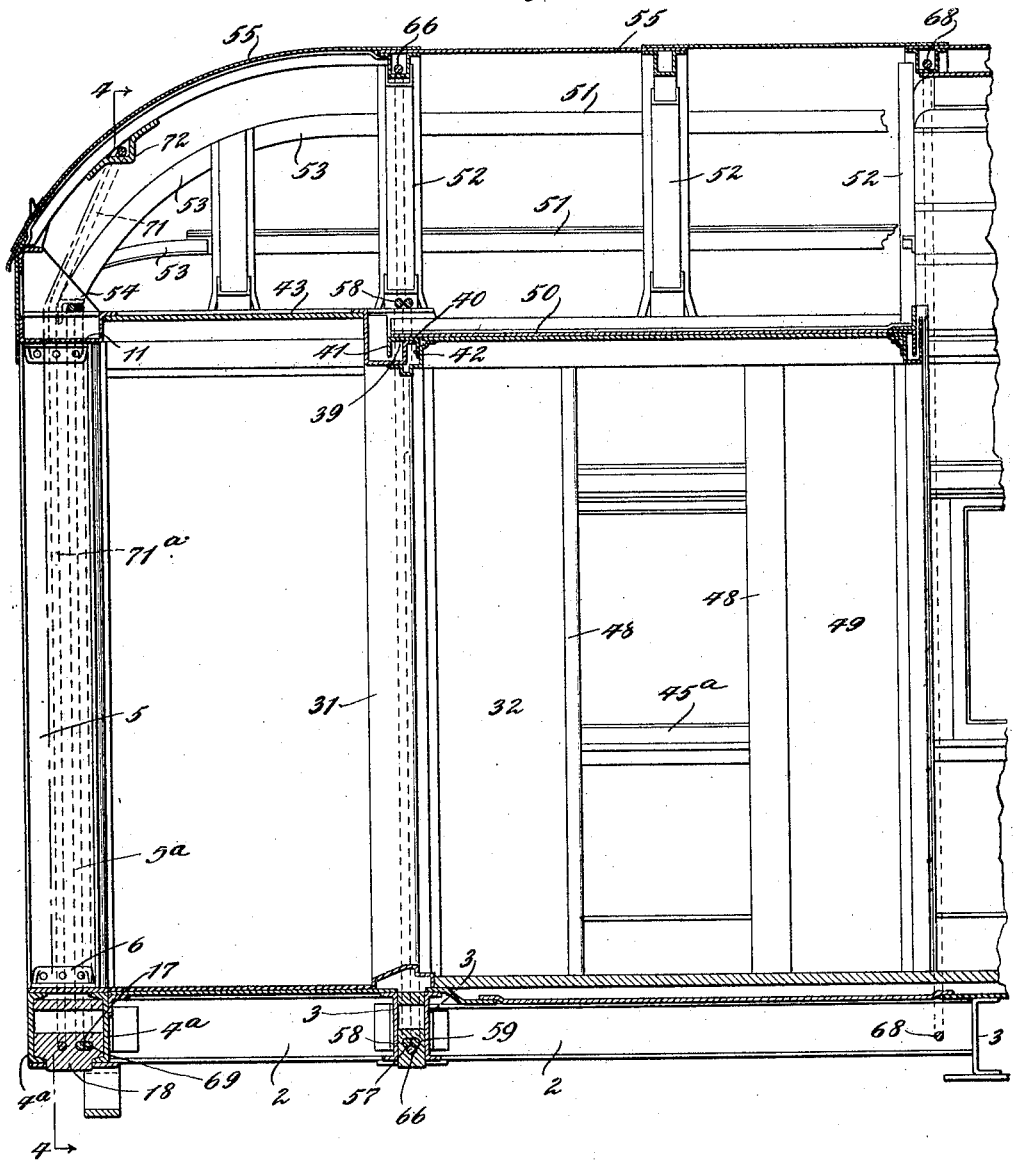

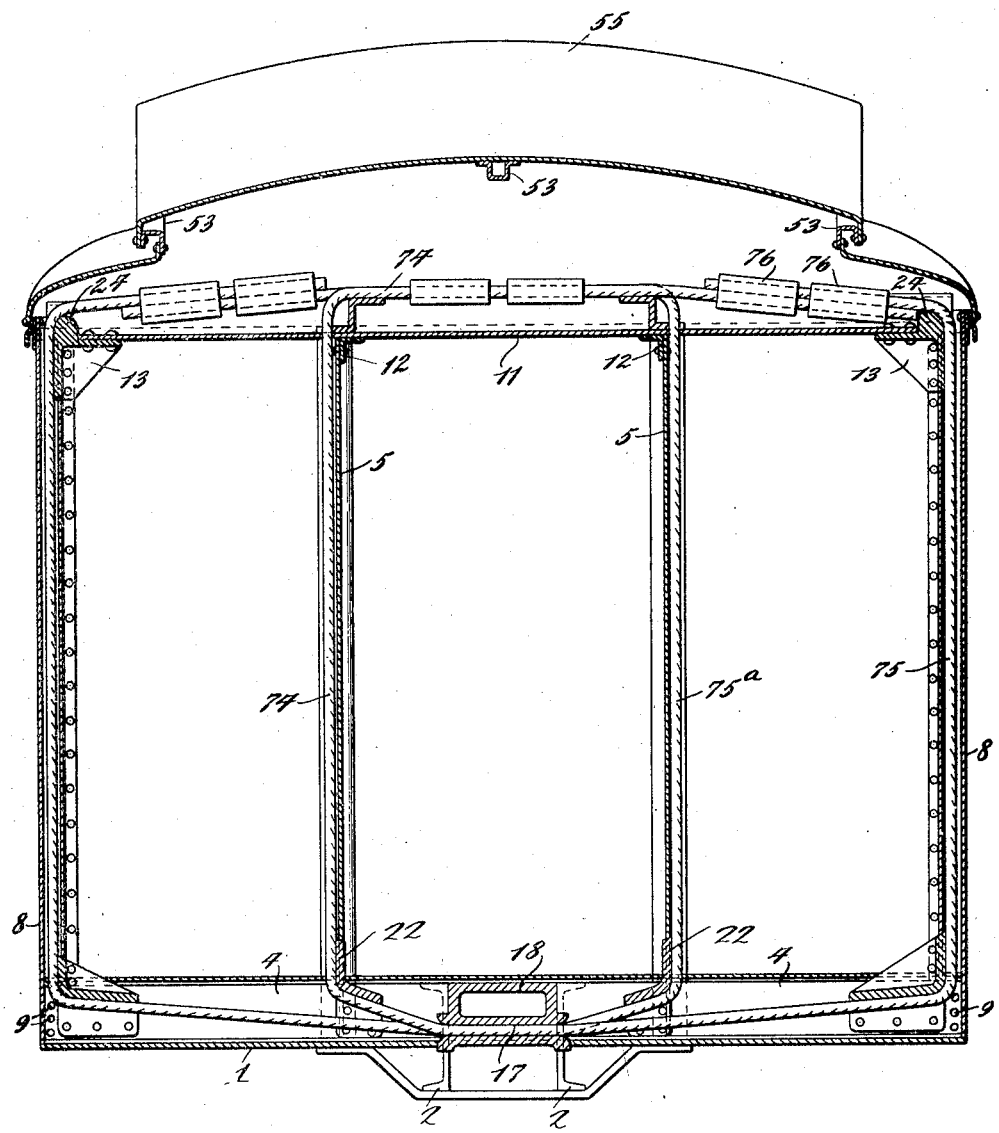

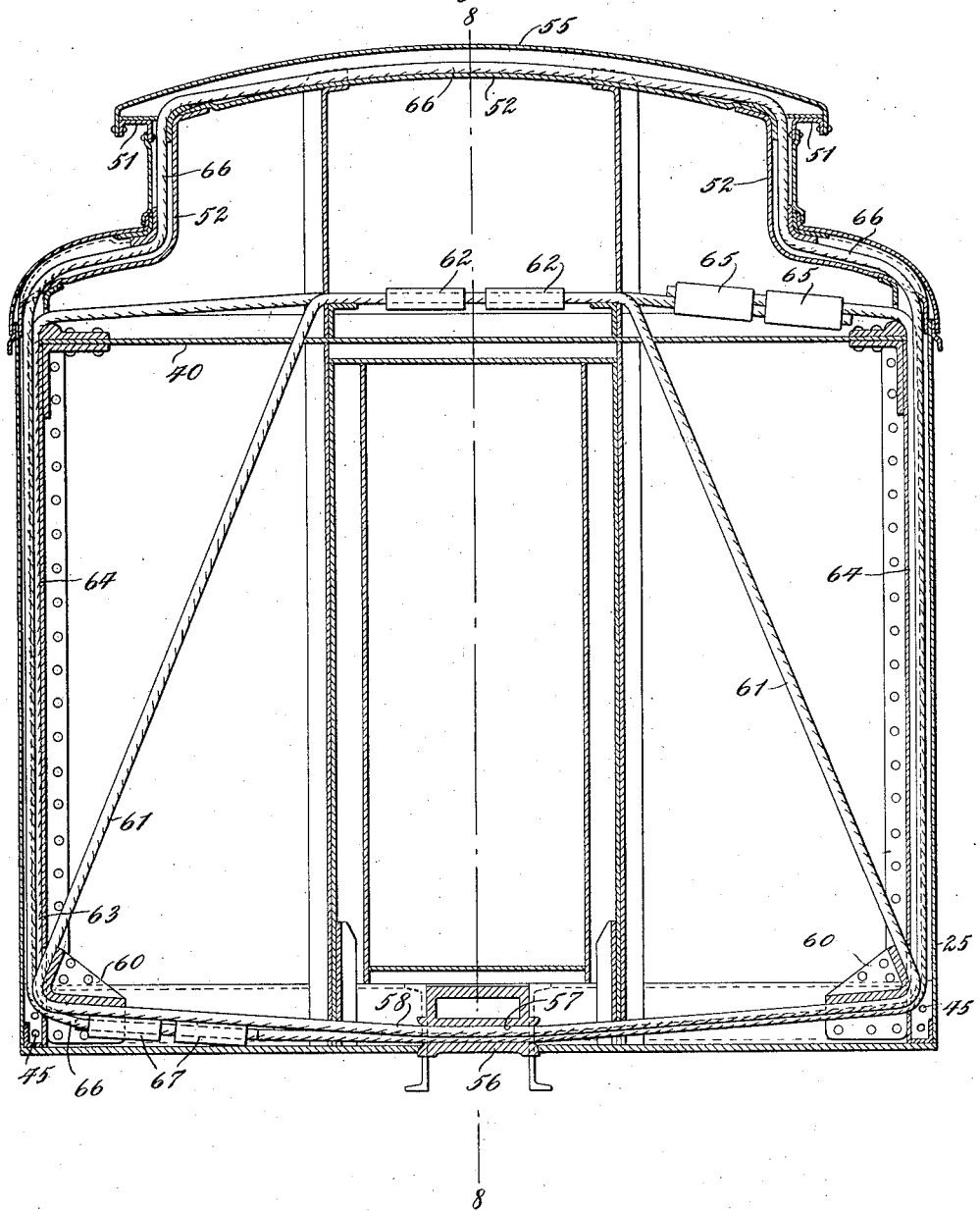

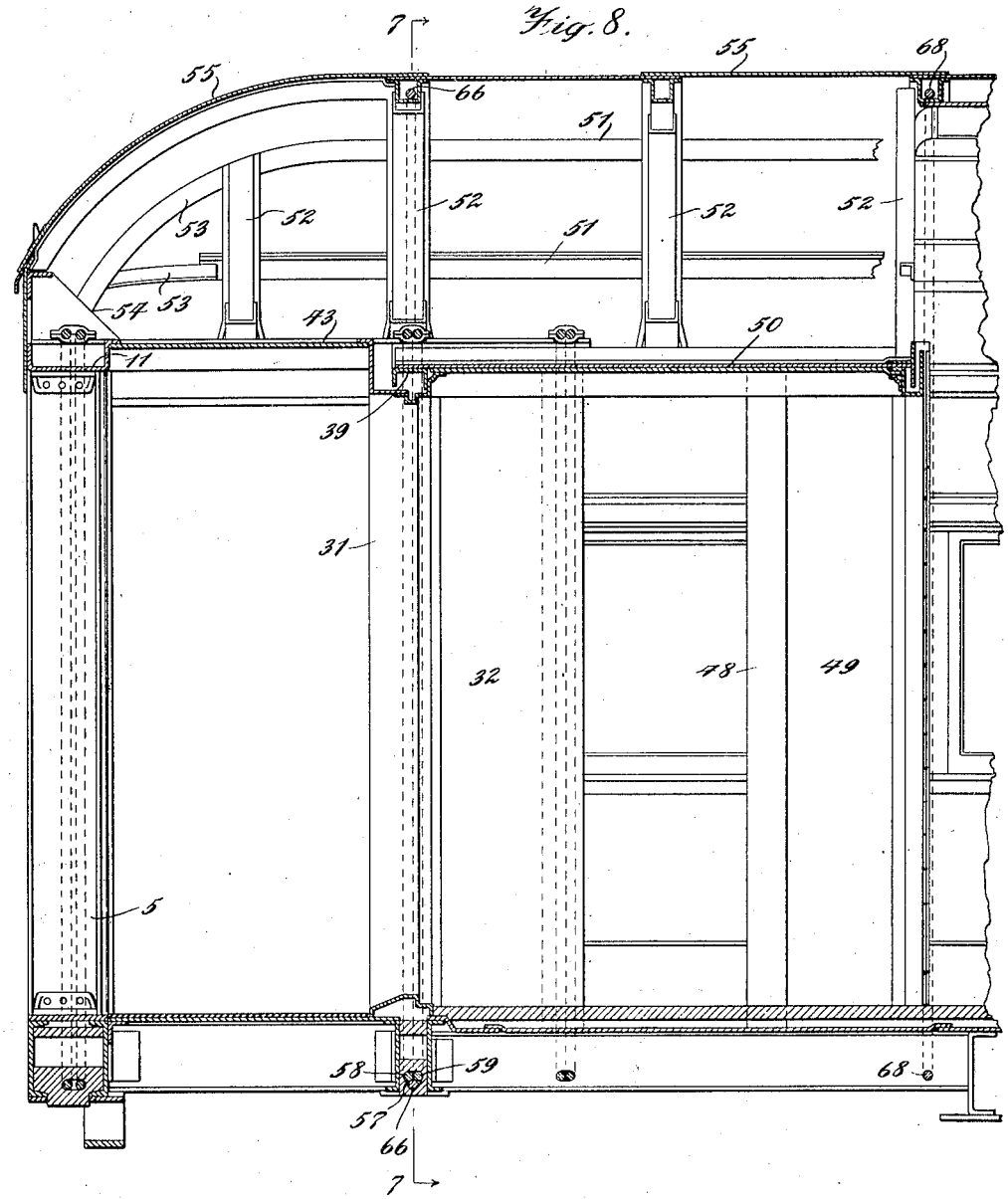

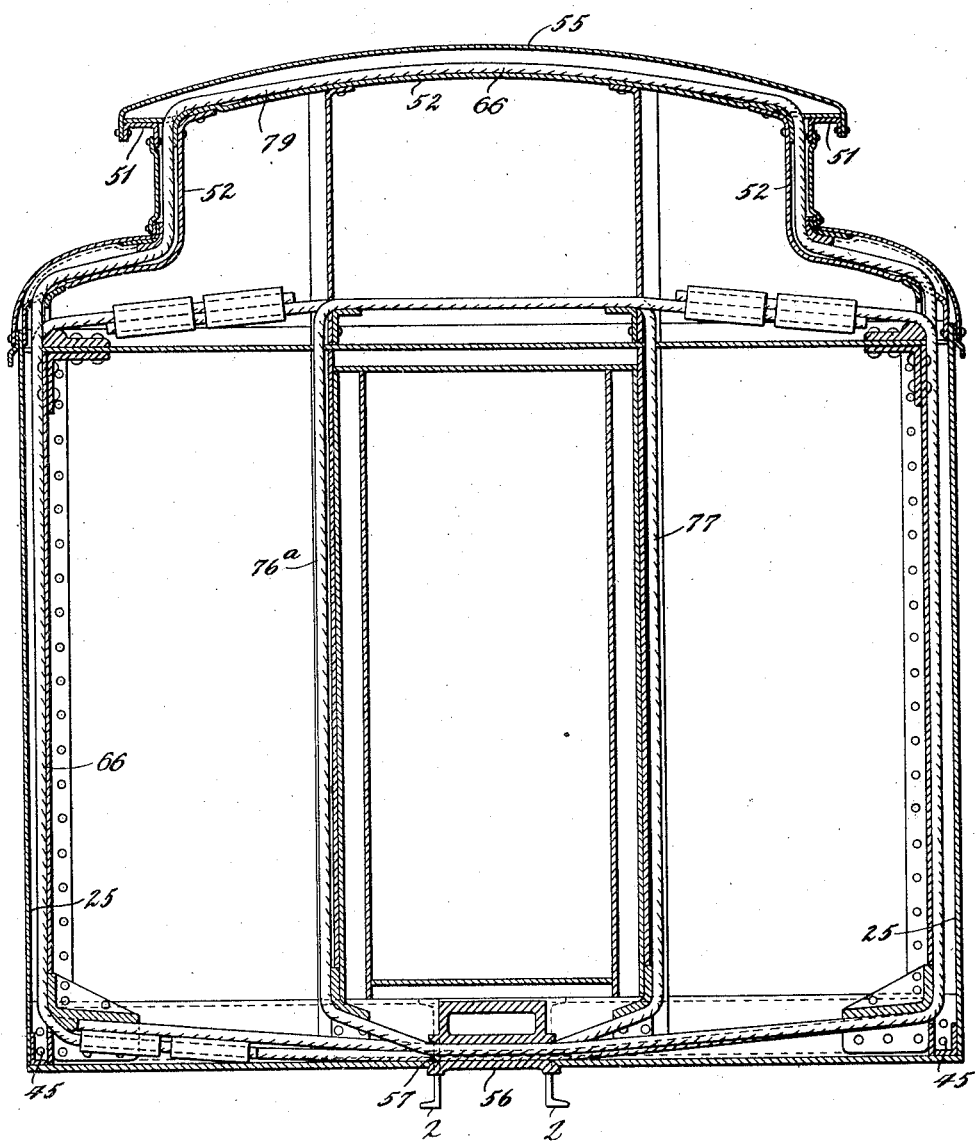

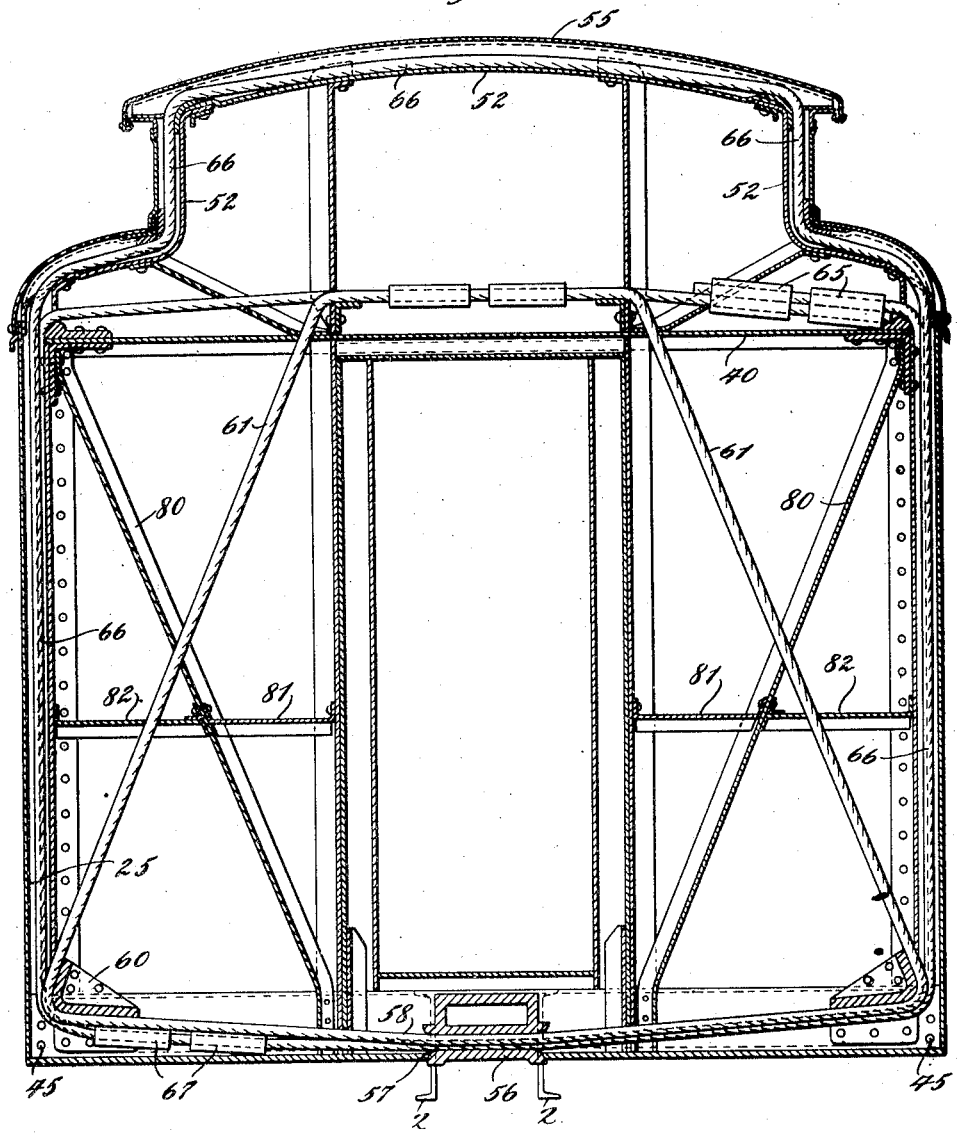

FRANCIS M. BRINCKERHOFF, OF ENGLEWOOD, NEW JERSEY, ASSIGNOR TO LEWIS B. STILLWELL, OF LAKEWOOD, NEW JERSEY, AND HENRY S. PUTNAM, OF NEW YORK, N. Y.

RAILWAY-CAR.

1,355,209.

Specification of Letters Patent.

Patented Oct. 12, 1920.

Application filed July 27, 1916. Serial No. 111,583.

*To all whom it may concern:*

Be it known that I, FRANCIS M. BRINCKERHOFF, a citizen of the United States, residing at Englewood, in the county of Bergen and State of New Jersey, have invented certain new and useful Improvements in Railway-Cars, of which the following is a specification.

My invention relates broadly and generally to new and useful improvements in railway cars.

The object of my invention is to provide means which will prevent or minimize the danger of telescoping in case of collision and will minimize the injury resulting therefrom.

In order to attain the above objects, the invention consists in the combination with the framework of a car structure, of flexible elements, whose function, in one aspect, is to limit the separation of the members of the said structure, following the failure of the joints or framework of the rigid structure, and in another aspect, to serve to intercept a telescoping body and tend to impart motion to the car which is struck.

I have fully and clearly illustrated my invention in the accompanying drawings to be taken as a part of this specification, and wherein:

Figure 1 is a transverse vertical section through a car embodying my invention, taken on the line 1—1 of Fig. 2.

Fig. 2 is a central longitudinal section on the line 2—2 of Fig. 1.

Fig. 3 is a half-section on the line 3—3 of Fig. 2.

Fig. 4 is a vertical transverse section of another embodiment of my invention, the section being taken on the line 4—4 of Fig. 5.

Fig. 5 is a section taken on the line 5—5 of Fig. 4.

Fig. 6 is a vertical transverse section located similarly to Fig. 4 of another modification showing a different arrangement of the tie members from that shown in the previous figures.

Fig. 7 is a vertical transverse section of another modification on the line 7—7 of Fig. 8.

Fig. 8 is a central longitudinal section on the line 8—8 of Fig. 7.

Fig. 9 is a vertical transverse section of an arrangement somewhat similar to that shown in Fig. 7, and located similarly.

Fig. 10 is a vertical transverse section through another embodiment somewhat similar to that shown in Fig. 7, and located similarly.

Before proceeding to a detail description of my invention, I desire to make it clear that the same is not limited to any particular type of car structure, as it may be applied to various types of cars without departing from the scope of my invention. I also desire it understood that the invention is applicable generally to the various types of cars, either of wood or steel construction, and particularly those embodying an under-structure, side wall-structures and roof-structures made up of metallic members united by joints, in order to provide a strong and efficient car, inclusive of the many types of cars known at the present time as "steel cars."

Referring to the drawings by characters of reference, and particularly to Figs. 1, 2 and 3, 1 designates generally an under-structure which may be of any of the well-known types, but which for purposes of exemplification in this application is shown as including center sills 2, to which are connected, in any suitable manner, floor girders 3, by means of which the floor and side walls of the car are supported. In Fig. 1, 4 designates the vestibule end sill supported by the ends of the center sills, and consisting of the channels $4^a$ arranged with their webs vertical and their flanges directed toward each other. From the end sill rises the vestibule end post 5, the lower end of which is secured to said end sill by an angle 6, the wings of the latter being suitably riveted, as at 7, or otherwise connected to the end sill and the web $5^a$ of the vestibule end post which is shown in the form of an I-beam set with its web in a vertical plane extending longitudinally of the car-body. Rising from the outside ends of the vestibule end sill are the vestibule corner posts 8, which are shown in cross-section in Fig. 3. These end posts 8 may be of any desired construction, but are preferably shown as hollow columns, the lower ends of which are riveted to the outer ends, respectively, of the vestibule end sill 4, as shown at 9. Suitably secured to the said vestibule end posts 5 and the said vestibule corner posts 8 are the vestibule end wall plates 10, which complete the vestibule end wall. Connecting the upper ends of the vestibule corner posts 8 and the vestibule end posts 5 is a transverse member 11, the same being secured to the upper ends of the posts 5 by means of angles 12, suitably riveted to the web of said posts and the web 11$^a$ of said member 11, the latter being preferably in the form of a channel disposed with its said web 11$^a$ horizontal, and with its flanges 11$^b$ extending upward therefrom. The outer ends of the member 11 are secured to the upper ends of the columns 8 by any suitable means, which may, if desired, be in the form of gusset joints 13, having suitable flanges 13$^a$, to which the webs of the posts 8 and the web 11$^a$ of the member 11 are secured by rivets 14, 15, respectively.

It will be understood that I do not limit myself to the particular type of car above described, or the parts or members thereof, or the joints or connecting means for uniting any of the said parts or members, as my invention is applicable to any type of car, and any means which may be employed for connecting the parts or members thereof.

In order to restrain separation, distortion or failure of the parts of the vestibule end wall, above described, when subjected to impact, for instance that resulting from collisions, I provide means for supplementing said parts, so that, in case of failure of any of the joints, connecting parts, or structural members, the same will be restrained from undue separation or distortion which would ordinarily result in dismemberment of the structure. This restraining means may consist, as shown in the drawings, of a flexible member which may be in the form of a wire, a wire rope or cable 16, which is passed through an opening 17 in a block 18, carried preferably by the center sills between the beams 4$^a$ composing the vestibule end sill, this cable 16 being carried upward from the under-structure, and said block 18, over the joints between the vestibule end posts 5 and the under-structure, and the joints between the vestibule corner posts 8 and the member 11, the ends of the said cable being connected by any suitable coupling, as indicated generally at 19. It will be seen that in the arrangement described the said restraining member or cable is located closely adjacent the joints 6 and 13, whereby the members connected by said joints, in case of destruction or separation of the latter, will be restrained against movement by said cable. The result is, that the vestibule corner posts 8 will be restrained from such outward movement laterally of the longitudinal axis of the car, as usually results when the vestibule end wall is subjected to collision impact resulting in telescoping. In the arrangement described it will be seen that the cable is inclined upward from the joints 6 toward the joints 13, so that portions 21, 21, of the cable 16 extend across the interior space of the car, thereby being arranged in the path of movement of bodies which might ordinarily be telescoped within the car-body. Should the members 21 of the restraining member 16 be struck by a body, the effect will be to place the restraining member under tension, drawing the same tightly about the vestibule end wall-structure and thereby operating not only to restrain disruption of the parts, but to bind and hold the same together, and also to present an obstacle to the entrance within the car of the body delivering the blow on the vestibule end wall. In order that the cable 16 will not be formed with sharp turns at the points where it engages the adjoining members of the car structure, I preferably provide, adjacent to each of the joints 6, a leader block or member 22 in the form of an obtuse angle, over which the cable passes, and form the joints 13 with a leader surface consisting of a vertical side face 23 and a curved upper-bearing face 24, against which faces the cable bears where it passes on the outer side of the joint between the post 8 and the member 11. The leader blocks 22 are provided with flanges 22$^a$, by which they may be riveted to the under-structure, as shown in Fig. 1. The block 18 and the leader blocks 22 may be made in a single casting if desired. It will be seen that the restraining cable is arranged within the vestibule end wall-structure, so that it does not in any way interfere with the vestibule passage space, or the platform space.

Again referring to Fig. 3, 25 designates a body corner post preferably in the form of a hollow member made up of a side wall 26 and a front wall 27, the latter having a flange 28, which is united to a vertical channel-member 29, having flanges 30, respectively united to said flange 28, and to a body side post (to be hereinafter described), in any suitable manner. 31 designates a body end door post, also preferably in the form of a hollow member, and made up of a saloon wall plate 32 and a member 33, substantially in the form of a channel, having flanges 34, 35, united to said plate 32 in any suitable manner. Secured to the body end door post is the web of a vertical channel or post 36, the flanges 37 of which are connected to the flanges 30, 30, of the body corner post by plates 38, constituting the body end wall. At their upper ends, the body corner posts 25, and the body end door posts 31, are connected by a horizontal member 39, in the form of a channel, the web 40 of which is horizontally disposed and the flanges 41, 42, of which are disposed vertically, as shown in Fig. 2 of the drawings.

Connected to the part 26 of the body corner post 25 is the side wall post 44 forming part of, or included in, the side wall of the body-structure, the lower ends of said posts being riveted to the side sill of the understructure, as shown at 45, in Fig. 7. This side post structure 44 may be in the form of a hollow member, as shown, or any other desired form. Another one of these posts is shown at 44ª, in Fig. 3, suitably spaced from the side post 44, the space between said posts constituting a window opening containing the window sash 45ª.

46 designates the inner saloon corner post, and 47 is the saloon transverse end wall which is connected to said posts 46 and the inner face of the post 44ª, in any suitable manner. 48 designates saloon door posts which are connected, respectively, by the plate 32 to the post 31, and by the plate 49 to the said post 46.

Overlying the saloon space and the passageway connecting the platform with the interior of the car-body, is a ceiling plate 50, which may be constructed in accordance with the invention of my prior application Serial No. 857,619, filed August 20, 1914, now Patent No. 1,231,235, issued June 26, 1917.

The car roof-structure may be of any desired type, for instance embodying the purlins 51 and the arched carlines 52, the body end carline rising from the ends of the body corner post 25 for a purpose to be presently described. The ends of the purlins are curved downwardly over the vestibule structure as at 53, and secured to the vestibule end wall in any suitable manner, as at 54. The roof sheathing supported by the purlins and the carlines is shown as at 55.

I also provide means for restraining movement or separation of the car-body side walls and the roof-structure by incorporating the flexible restraining members in, or adjacent to, the body end wall, so that separation or outward movement of the side walls and the raising or lifting of the roof are prevented. This arrangement is shown in section in Figs. 2, 5 and 8, and in elevation in Figs. 7, 9 and 10, wherein I provide an anchor member 56 held by the body end sill and having a transverse opening 57, through which are passed restraining cables 58, 59, respectively. The cable 58 passes outward in opposite directions from the member 56, and across the under-structure to the body corner posts around leader blocks 60, mounted at points adjacent the connection of the side posts with the understructure, from which points the ends of the said cable are carried upward and inward, as at 61, to a point above the body end outer posts, where they are carried over the member 40 and associated parts, and connected by suitable couplings 62. It will be seen that this cable 58 serves to restrain separation of the side posts from the understructure, and also to prevent lifting of the superstructure or roof-structure, inclusive of the member 40, and associated parts, from the side wall structure. In the same manner as was described with reference to the member 16, the parts 61 of the cable 58 traverse the interior space of the car to form an obstruction to a striking body, and adapted to be placed under tension thereby to strongly bind the parts of the car together. In addition to the member 58 I may, and preferably do, provide another member 59, also passed through the opening 57 and over the leader members 60, from which they pass upward through the body corner posts 25, as at 64, and are carried over the joints connecting the said post 25 with the under-structure and the superstructure to a point over the member 40, where the ends are connected by suitable couplings 65. This cable 59 serves, as one of its functions, to prevent outward movement of the upper portions of the side wall in case the joints uniting the same with the member 40 are broken.

If it is desired to restrain lifting movement of the roof, I provide a third cable 66, see Figs. 2, 5, 7, 8, 9 and 10, also passed through the opening 57 beneath the leaders 60 and up the hollow body corner posts, from which points it passes through the carline 52. The ends of this rope 66 may be united at any point, for instance, as shown at 67, by suitable couplings. It will be seen that this cable not only serves to restrain outward movement of the side walls, in case of failure of the connections between the same and the under-structure and the roof, but also serves to restrain the deck-structure and roof-structure against being lifted by blows tending to separate the same from the side wall-structure. As shown in Figs. 2, 3, 5 and 8, I may provide additional cables 68 passing through the under-structure, the side wall-structure and the roof-structure at one or more of the side posts, or other suitable points, located lengthwise of the car.

In Figs. 4 and 5, I have shown another application of the invention before described, in which the restraining members may be located in the vestibule end wall-structure and in the body end wall-structure in the manner just described, and in addition thereto I may provide another restraining member for preventing upward movement of the vestibule roof-structure, said member being so arranged that when subjected to an impact blow and placed under tension, it will serve to drag down the vestibule roof portion and cause the latter to present an obstruction to the body delivering the collision blow. In this embodiment, I may provide a restraining member 69 passed through an opening 17 in a block 18, such as heretofore described, and carried up through the vestibule corner posts 8, and thence over the top of the member 11 and connected by couplings 70 in the same manner as the members 59, heretofore described, this member 69 serving to restrain outward movement of the side walls and to hold down the superstructure of the vestibule end wall. In addition to this member 69, I provide a restraining member 71, also passed through the opening 17, and over joints 13, heretofore described, from which point the said cable is inclined upward and backward and looped through a retaining member 72 secured to the under-side of the vestibule roof. This member 72 is preferably in the form of an angle extending transversely of the vestibule roof-structure and secured to the under side thereof in any suitable manner. The member 71 is arranged to extend across the interior space of the car, as at 71$^a$, so as to provide an obstruction which will intercept an object about to enter the car, and be thereby placed under tension so as to exert a downward pull on the vestibule roof, the result being that the latter will be pulled down in the path of the striking body to obstruct the latter instead of being moved upward to give the striking body the opportunity of passing under the same, as is the general experience in telescoping collisions. The ends of the member 71 may be secured together at any suitable point by couplings 73.

In Fig. 6 I have shown another modification of my invention as applied to the vestibule end wall. In this form of the invention one of the flexible members is shown at 74, the same being passed through the opening 17 in a block 18 and up the outer side of one of the vestibule end posts, and within the vestibule end walls, whence it passes over the member 11 to the vestibule corner post 8 on the opposite side of the car, said member 74 passing through said vestibule end posts, as at 75, and having its ends connected in any suitable manner, as at 76. Another member 75$^a$ is employed for uniting the opposite vestibule corner post 8, from that just described, to the other vestibule end post 5. By this arrangement the inner vertical portions of the flexible restraining members are made to traverse the interior space of the car so as to present the desired obstruction to the passage of the body striking the vestibule end wall, so as to assist in the prevention of the latter being telescoped within the car-body provided with said restraining means. In Fig. 9 I have shown the arrangement just described as applied to the body end wall, the cables being shown at 76$^a$, 77, respectively, and in addition I show a third cable 66 having a portion extending through the carlines so as to restrain movement of the roof-structure in the event of failure of the joints uniting the same to the body-structure.

In Fig. 10 I have shown the same arrangement of restraining members for both the side walls and roof-structure as shown in Fig. 7, but in addition have shown compression members for preventing collapse of the side walls, or their movement inward, said means consisting of inclined braces 80 connected at their lower ends to the floor-structure adjacent the bases of the body end door posts, and at their upper ends to the joint uniting the ends of the body corner posts with the member 40. These inclined members 80 may be stiffened by transverse members 81, 82, connected to said member 80 intermediate its ends and to the body end outer post and the body corner posts, respectively.

In all of the forms of the invention shown and described the restraining members perform two important functions. The first of these is to supplement the joints and members composing the car-structure in such a way as to limit separation of the members upon failure of the joints or of said members, and also to restrain distortion of said members when subjected to bending and twisting strains. Second, the restraining members upon collision impact will be drawn into engagement with or around the telescoping body, so as to intercept the same and limit its telescoping movement so that the impact will be exerted to move the car along the roadway instead of to break it asunder and permit the striking body to enter. The restraining members need not in all embodiments of the invention serve to restrain separation or movement of the car members, but may be held in the form of a distended loop by said members for engaging and intercepting a telescoping body.

By anchoring the restraining members to the under-structure an important advantage is attained, in that any force exerted by a blow or push on the flexible members will be transmitted to the under-structure, which will result in the under-structure, and consequently the entire car-body, being moved along the roadway instead of remaining fixed and consequently subjected to the full destructive effect of the impact.

While, in the preferred embodiment of the invention, I have shown and described the restraining members as consisting of wire rope cables, as they provide a convenient and efficient means for the purpose. I do not desire to be limited to such members as these members may be constructed in any manner which would attain the results above set forth, as long as they have the desired characteristic of bending without fracture.

I desire it understood that my invention is not limited to anchoring the restraining member securely to the under-structure, as any means of connecting or holding the restraining member to the under-structure may be employed which will hold the member at the under-structure in such manner as to tend to impart motion to the under-structure in case of collision—that is, the invention contemplates any means of connecting the restraining member to the under-structure which will hold said member against vertical movement relative to the under-structure, and support said member in effective position to intercept the telescoping body.

The restraining member is strong enough to resist breaking under strains from collisions which would break the exterior walls or joints of the car, and it is therefore adapted to continue to hold those walls from spreading after such breakage has occurred.

What I claim and desire to secure by Letters Patent of the United States is—

1. A car structure comprising an under-structure, side walls and a roof-structure, and continuously flexible means adapted to intercept a telescoping body, said means being fixed to the under-structure.

2. A car structure comprising an under-structure, side walls and a roof-structure, and flexible continuous tension means adapted to intercept a telescoping body, said means being fixed to the under-structure.

3. A car structure comprising an under-structure, side walls and a roof-structure, and a continuously flexible member restraining said parts against separation and distortion, said flexible means being anchored to the under-structure.

4. A car structure comprising an under-structure including a sill, side walls and a roof-structure, and continuously flexible means restraining separation and distortion of said elements, said flexible means being anchored to said sill.

5. A car structure comprising an under-structure, side walls and a roof-structure, said elements being connected by joints, and a continuously flexible member restraining separation of said elements upon disruption of the joints, said flexible means passing around said elements.

6. A car structure comprising an under-structure, side walls and a roof-structure, and a continuously flexible member restraining separation of said elements, said flexible member passing around said elements and being anchored to the under-structure.

7. A car structure comprising an under-frame, side walls and a roof-structure, and a cable passing around said side walls and roof-structure and being connected to the under-structure.

8. A car structure comprising an under-structure, side walls and a roof-structure, and a flexible member uniting said elements and restraining separation of the same, said member being incorporated in the side wall structure.

9. A car structure comprising an under-structure, side walls and a roof-structure, and a flexible member uniting said elements and restraining separation of the same, said member being incorporated in the side wall structure and anchored to the under-structure.

10. A car structure comprising an under-structure, side walls and a roof-structure, said side walls including vertical posts, and a flexible member restraining separation of said elements, said member being housed within said posts.

11. A car structure comprising an under-structure, side walls and a roof-structure, said side walls including vertical posts, and a flexible member restraining separation of said elements, said member being housed within said posts and connected with the under-structure.

12. A car structure comprising an under-structure, side walls and a roof-structure, and a continuously flexible member restraining separation of the said elements and extending across the interior space of the car.

13. A car structure comprising an under-structure, side walls and a roof-structure, and a continuously flexible member restraining separation of the said elements and extending across the interior space of the car, said member being anchored to the under-structure.

14. A car structure comprising an under-structure, side walls and a roof-structure, and a cable restraining separation of said members, said cable being incorporated in the side wall-structures and being connected to the roof-structure and the under-structure.

15. A car structure comprising an under-structure, side walls and a roof-structure, and a cable restraining separation of said members, said cable being incorporated in the side wall-structures and being connected to the roof-structure and the under-structure, a portion of said cable traversing the space within the car-body.

16. A car structure comprising an under-structure, side walls and a roof-structure, said members being united by joints, and a flexible member anchored to the under structure and incorporated within a side wall and adapted to restrain outward movement of the side wall upon disruption of the joints connecting the same to the roof-structure and the under-structure.

17. A car structure comprising an understructure, side walls and a roof-structure, said members being united by joints, and a flexible member anchored to the under structure and incorporated within a side wall and adapted to restrain outward movement of the side wall upon disruption of the joints connecting the same to the roof-structure and the under-structure, a portion of said cable extending across the internal space of the car.

18. A car body comprising an understructure, side wall-structures and a roof connected by joints, and a continuous flexible member uniting said members and restraining movement of the side walls upon disruption of the joints.

19. A car structure comprising an understructure, side wall-structures and a roof-structure united by joints, and a continuously flexible member connected to the roof and side wall-structures to restrain outward movement thereof upon disruption or distortion of the joints, said member having its ends anchored to the under-structure.

20. A car structure comprising an understructure, side wall-structures and a roof-structure, said side wall-structures including side posts rising from said under-structure, said elements being connected by joints, and a flexible member connecting said side wall-structures and lying over and extending longitudinally of said side posts, said flexible member serving to restrain movement of the side walls upon disruption of said joints.

21. A car structure comprising an understructure, side wall-structures and a roof-structure, said side wall-structures including channeled side posts and rising from said under-structure, said members being connected by joints, and a flexible member connecting said side wall-structures with the under-structure and housed within the channels of said side posts, said flexible member serving to restrain outward movement of said side wall-structures upon disruption of the joints.

22. A car structure comprising an understructure, side wall-structures and a roof, said side wall-structures including side posts and rising from the under-structure, carlines supporting the roof, said members being connected by joints, and a flexible member connecting said side-walls with the under-structure and lying over and extending longitudinally of the side posts and carlines, said flexible member serving to restrain upward movement of the side walls upon disruption of the said joints.

23. A car structure comprising an understructure, a body-structure, and a vestibule-structure, a roof to the vestibule-structure, and flexible means connecting the vestibule roof-structure to the under-structure.

24. A railway car comprising an understructure, a body-structure, and a vestibule-structure, the vestibule-structure having a vestibule end wall and a roof-structure, and flexible means uniting the roof-structure with the under-structure and passing through the vestibule end wall structure.

25. A car structure comprising an understructure, a body-structure, and a vestibule-structure, the vestibule-structure including a roof, and a vestibule end wall connected by joints, and flexible means restraining separation of said members upon disruption of the joints.

26. A car structure comprising an understructure, a body-structure, and a vestibule-structure, the vestibule-structure including a roof, and a vestibule end wall connected by joints, and flexible means restraining separation of said members upon disruption of the joints, said flexible means being connected to the under-structure.

27. A car structure comprising an understructure, a body-structure, and a vestibule-structure, the vestibule-structure including a roof, and a vestibule end wall connected by joints, and flexible means restraining separation of said members upon disruption of the joints, said flexible means being connected to the under-structure and extending across the vestibule end wall structure.

28. A car structure comprising an understructure, a body end wall, a vestibule end wall, and a roof, said members being connected by joints, and a flexible member located in the body end wall and connected to the roof at a point intermediate the vestibule end wall and the body end wall, and bridging the joints.

29. A car structure comprising an understructure, a body end wall, a vestibule end wall, and a roof, said members being connected by joints, and a flexible member located in the body end wall and connected to the roof at a point intermediate the vestibule end wall and the body end wall, and bridging the joints, said flexible member being anchored to the under-structure.

30. A car structure comprising an understructure, side walls and a roof, and flexible means encircling the side walls and extending transversely of the car.

31. A car structure comprising an understructure, side walls and a roof, and flexible means encircling the side walls and extending transversely of the car, said flexible means being connected to the under-structure so as to be immovable lengthwise of the car at the under-structure.

32. A car structure comprising an understructure and a roof and a continuously flexible member in the form of a loop anchored to the under-structure, and means for supporting said loop in distended position.

33. A car structure comprising an understructure, side walls and a roof and a continuously flexible member in the form of a loop anchored to the under-structure and supported in distended position by the members of the car structure.

34. A car structure comprising an understructure, side walls and a roof and a continuously flexible member embodying a loop connected to the under-structure and held in distended position by the side wall structure.

35. A car structure comprising an understructure, side walls and a roof and a continuously flexible member embodying a loop connected to the under-structure and supported in distended position by the side wall structures, the upper portion of said loop extending across the car adjacent the roof structure.

36. A car structure comprising an understructure and a roof, and a continuously flexible distended loop member anchored to the under-structure and adapted to intercept a telescoping body.

37. A car structure comprising an understructure and a roof, and a vertically disposed distended continuously flexible loop member anchored to the under-structure and adapted to intercept a telescoping body.

38. A car structure comprising an understructure and a roof, and a vertically disposed continuously flexible loop member anchored to the under-structure and extending transversely of the car, and adapted to intercept a telescoping body.

39. A car structure comprising an understructure, a roof and side walls, and a distended continuously flexible loop member anchored to the under-structure, and means for connecting the limbs of the loop to the said side walls.

40. A car structure comprising an understructure and a roof, and a distended continuously flexible loop member extending vertically from the under-structure, and means at the under-structure for holding said loop member.

41. A car structure comprising an understructure including center sills, a roof, and a vertically disposed continuously flexible loop member supported by the center sills.

42. A car structure comprising an understructure, including center sills, a roof, and a vertically disposed continuously flexible loop member supported by the center sills, portions of said loop member extending across the interior space of the car.

43. A car of substantially tubular metallic structure comprising a roof structure, side walls and an under structure, and a flexible loop anchored to the under structure and having an embracing hold upon said tubular structure, the tensile strength of said loop against the forces caused by collision being greater than the circumferential tensile strength of the tubular structure, whereby said loop will be unbroken after the tubular structure has been ruptured circumferentially.

44. A car structure comprising an under structure, side walls and a roof structure, and a loop having flexed portions engaging one of said side walls and said roof structure.

45. A car structure comprising an under structure, side walls and a roof structure, and a loop having flexed portions engaging one of said side walls, and said roof structure and said understructure.

46. A car structure comprising an under structure, side walls and a roof structure, and a loop anchored to the under structure and having a flexed portion engaging a side wall.

47. A car structure comprising an under structure, side walls and a roof structure, and a loop anchored to the under structure and having a flexed portion engaging said side walls.

48. A car structure comprising an under structure, side walls and a roof structure connected by joints, and a loop having a flexible portion engaging one of said joints.

49. A car structure comprising an under structure, side walls and a roof structure connected by joints, and a loop having a flexible portion engaging one of said joints, said loop being anchored to the under structure.

50. A car structure comprising an under structure, side walls and a roof structure connected by joints, and a loop having a flexible portion engaging a joint between a side wall and said roof structure, said loop being anchored to the under structure.

51. A car structure comprising an under structure, side walls and a roof structure, said members being united by joints, and a flexible loop member anchored to the under structure and engaging a side wall and the roof structure, and embracing the joint between the side wall and roof structure.

52. A car structure comprising an under structure, a roof structure and side walls, and a flexible loop member including a cable, said member being anchored to the under structure and adapted to intercept a telescoping body.

53. A car structure comprising an under structure, a roof structure and side walls, and a flexible loop member including a cable, said member being anchored to the under structure and engaging a side wall to restrain the same against disruptive movement.

54. A car structure comprising an under structure, a roof structure and side walls, and a flexible loop member including a cable, said member being anchored to the under structure and connecting a side wall to the roof structure and to the under structure.

55. A car body comprising an under structure, a side wall structure and a roof structure connected by joints, and a cable member in loop form uniting said structures and restraining movement thereof upon disruption of the joints.

In testimony whereof I have hereunto signed my name in the presence of two subscribing witnesses.

FRANCIS M. BRINCKERHOFF.

Witnesses:
C. G. HEYLMUN,
M. E. McNINCH.